US011726232B2

(12) United States Patent
Machefaux et al.

(10) Patent No.: US 11,726,232 B2
(45) Date of Patent: Aug. 15, 2023

(54) METHOD FOR REAL-TIME PREDICTION OF WIND CONDITIONS ACROSS A WIND FARM

(71) Applicant: VESTAS WIND SYSTEMS A/S, Aarhus N. (DK)

(72) Inventors: Ewan Machefaux, Tune (DK); Kim Emil Andersen, Aalborg (DK); Frank Ormel, Skanderborg (DK); Mogens Bjerning, Ringkøbing (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/081,354

(22) Filed: Dec. 14, 2022

(65) Prior Publication Data
US 2023/0184995 A1 Jun. 15, 2023

(30) Foreign Application Priority Data
Dec. 14, 2021 (EP) ..................................... 21214226

(51) Int. Cl.
*G01W 1/10* (2006.01)
(52) U.S. Cl.
CPC ...................... *G01W 1/10* (2013.01)
(58) Field of Classification Search
CPC ....................................................... G01W 1/10
See application file for complete search history.

(56) References Cited

U.S. PATENT DOCUMENTS

| 6,975,925 | B1 | 12/2005 | Barnes et al. | |
|---|---|---|---|---|
| 2003/0160457 | A1* | 8/2003 | Ragwitz | G01W 1/10 290/44 |
| 2006/0173623 | A1* | 8/2006 | Grzych | G01W 1/10 702/3 |
| 2010/0023266 | A1 | 1/2010 | Stiesdal | |
| 2012/0029824 | A1* | 2/2012 | Wilson | G01W 1/10 702/3 |

(Continued)

OTHER PUBLICATIONS

Milton J. Woods, Christopher J. Russell, Member, IEEE, Robert J. Davy, and Peter A. Coppin., Simulation of Wind Power at Several Locations Using a Measured Time-Series of Wind Speed. IEEE Transactions on Power Systems, vol. 28, No. 1 , Feb. 2013 (Year: 2013).*

(Continued)

*Primary Examiner* — Yoshihisa Ishizuka
(74) *Attorney, Agent, or Firm* — Patterson + Sheridan, LLP

(57) ABSTRACT

A method for real-time prediction of wind conditions across a wind farm comprising a plurality of wind turbines, the wind farm being arranged at a wind farm site, is disclosed. A first library of site specific mean wind flow patterns related to the wind farm site, and a second library of non-site specific turbulence patterns, are provided. Weather data is measured at a plurality of positions within the wind farm site, and based on the measured weather data, a mean wind flow pattern is selected based on the first library and a turbulence pattern is selected based on the second library. A site specific wind flow field across the wind farm site is modelled, based on the selected mean wind flow pattern and the selected turbulence pattern, and wind conditions across the wind farm are predicted, based on the site specific wind flow field.

16 Claims, 2 Drawing Sheets

(56) References Cited

U.S. PATENT DOCUMENTS

2015/0247953 A1* 9/2015 O'Brien ................. G01W 1/10
 416/41
2020/0063710 A1 2/2020 Farrokhabadi et al.
2020/0191997 A1* 6/2020 Candido ................. G06N 7/01

OTHER PUBLICATIONS

Extended European Search Report for European Patent Application No. 21214226.0-1001, dated Jun. 24, 2022.
Information on Search Strategy for European Patent Application No. 21214226.0-1001, dated Jun. 24, 2022.

* cited by examiner

METHOD FOR REAL-TIME PREDICTION OF WIND CONDITIONS ACROSS A WIND FARM

FIELD OF THE INVENTION

The present invention relates to a method for predicting wind conditions across a wind farm comprising a plurality of wind turbines, in real-time, and without requiring heavy data processing at the site of the wind farm.

BACKGROUND OF THE INVENTION

When operating wind turbines, measurements of wind conditions, such as wind speed, wind direction, turbulence conditions, etc., at the position of the wind turbine are normally used as control input. Thereby it is ensured that the wind turbine is operated in such a manner that an optimum power production is obtained, under the given circumstances, and without subjecting the wind turbine to excessive loads.

Sometimes it may be desirable to predict wind conditions, i.e. to foresee wind conditions, which the wind turbine will experience, before the wind conditions actually occur, because thereby precautionary measures may be taken in the operation of the wind turbine. This may, e.g., be relevant in case of extreme weather events, hyper local gusts, high turbulence, etc. Furthermore, for wind turbines arranged in a wind farm it may be particularly relevant to obtain early warning of such conditions across the wind farm. Furthermore, such prediction of wind conditions may render the control of the wind turbines resilient to sensor faults or the like. For instance, if a wind turbine looses sensor information, operation of the wind turbine can be maintained, based on the predicted wind conditions, rather than based on measured wind conditions.

Short-term prediction of wind conditions across a wind farm may, e.g., be obtained by performing real-time calculations based on wind measurements and accurate site specific flow models. However, such calculations require extensive processing power, at the site of the wind farm. Furthermore, if a sufficient accuracy is to be obtained, it may not be possible to perform the calculations in time to allow the wind turbines to take precautionary measures, even if extensive processing power is available at the wind farm.

DESCRIPTION OF THE INVENTION

It is an object of embodiments of the invention to provide a method for real-time prediction of wind conditions across a wind farm, without requiring extensive processing power at the site of the wind farm.

It is a further object of embodiments of the invention to provide a method for real-time prediction of wind conditions across a wind farm, in an accurate manner.

The invention provides a method for real-time prediction of wind conditions across a wind farm comprising a plurality of wind turbines, the wind farm being arranged at a wind farm site, the method comprising the steps of:
  providing a first library of site specific mean wind flow patterns related to the wind farm site,
  providing a second library of non-site specific turbulence patterns,
  measuring weather data at a plurality of positions within the wind farm site,
  based on the measured weather data, selecting a mean wind flow pattern based on the first library and a turbulence pattern based on the second library,
  modelling a site specific wind flow field across the wind farm site, based on the selected mean wind flow pattern and the selected turbulence pattern, and
  predicting wind conditions across the wind farm, based on the site specific wind flow field.

Thus, the invention provides a method for real-time prediction of wind conditions across a wind farm. In the present context the term 'wind farm' should be interpreted to mean a group of at least two wind turbines sharing infrastructure for power transmission to a power grid. Thus, the wind farm comprises a plurality of wind turbines. The wind turbines of the wind farm may be arranged at a geographical site, i.e. a wind farm site, and are preferably controlled by at least one central control unit, sometimes referred to as a power plant controller (PPC).

In the present context the term 'wind conditions' should be interpreted to mean conditions related to the wind and experienced by the wind turbines of the wind farm. The wind conditions may, e.g., include wind direction, wind speed, turbulence conditions, gust conditions, wind shear, etc.

In the method according to the invention, a first library of site specific mean wind flow patterns related to the wind farm site is initially provided. In the present context the term 'site specific mean wind flow pattern' should be interpreted to mean a pattern covering the entire wind farm site, which specifies mean wind conditions occurring at each position across the wind farm site, or at least at positions corresponding to each of the wind turbines of the wind farm, within a given time period. The wind flow patterns of the first library are site specific in the sense that they take into account certain features of the wind farm site, such as terrain, vegetation, roughness, positions of the wind turbines, dominant wind direction, diurnal variations in wind and weather conditions, seasonal variations in wind and weather conditions, etc. Accordingly, the site specific wind flow patterns of the first library constitute a collection of expected mean wind flow across the wind farm site in the near future, under various conditions, such as time of day, time of year, present wind conditions, etc.

The mean wind flow patterns of the first library may be calculated, using accurate flow models of the wind farm site, such as CFD models or coupled weather models, and/or based on previously obtained measurements of wind patterns at the wind farm site. This will be described in further detail below.

Furthermore, a second library of non-site specific turbulence patterns is provided. In the present context the term 'non-site specific turbulence pattern' should be interpreted to mean a pattern which specifies expected turbulence conditions in the near future, given the presently occurring wind conditions. The turbulence patterns may, e.g., specify turbulence intensity and/or turbulence eddy on temporal and/or spatial scales. The turbulence patterns of the second library are non-site specific, or site agnostic, in the sense that features which are specific to the wind farm site are not taken into account, possibly except for very generic features, such as 'offshore', 'hilly', 'tropical climate', and the like. The turbulence patterns may, e.g., represent very well high resolution turbulence observed in the atmosphere.

The turbulence patterns of the second library may also be calculated, using accurate flow models, such as synthetic turbulence obtained from Spectral Tensor method, e.g. Mann model, and/or based on previously obtained measurements of wind conditions, in particular turbulence conditions. This will be described in further detail below. Since the turbulence patterns are non-site specific, such previous measurements need not be obtained at the wind farm site, but could be obtained from a vast number of locations. Thereby a vast amount of measurement data may be available for generating the turbulence patterns of the second library.

Thus, it may require extensive processing power and/or time to provide the first library as well as the second library. However, since the first library and the second library are provided upfront, and readily available from the modelling work occurring in the design phase of the wind farm lifecycle, such processing may be performed well in advance of a point in time where real-time prediction of wind conditions across the wind farm is required. Furthermore, the processing need not take place at the wind farm, but could be performed at a suitable data centre where the required processing power is available.

When real-time prediction of wind conditions across the wind farm is required, weather data is measured at a plurality of positions within the wind farm site. In the present context the term 'weather data' should be interpreted to mean data related to the weather occurring at the wind farm site, such as wind speed, wind direction, turbulence conditions, wind shear, temperature, humidity, precipitation, air density, etc. The weather data may be measured by means of sensors arranged at or forming part of the wind turbines of the wind farm, by means of one or more metmasts arranged within the wind farm site, by satellite measurements, by lidar measurements, etc.

Based on the measured weather data, a mean wind flow pattern is selected based on the first library, and a turbulence pattern is selected based on the second library. Thus, the selected mean wind flow pattern and turbulence pattern reflect the actual weather conditions presently occurring across the wind farm site, and utilise the pre-calculations performed when the first library and the second library were generated. Accordingly, this step will not require extensive processing power, but the prevailing boundary conditions, in the form of the measured weather data, are still taken into account.

The mean wind flow pattern and/or the turbulence pattern may be selected by simply selecting one of the patterns which is already forming part of the first or second library, respectively. As an alternative, two or more wind flow patterns and/or turbulence patterns of the first and second libraries may form the basis of the selected wind flow pattern and turbulence pattern, respectively. This will be described in further detail below.

Next, a site specific wind flow field across the wind farm site is modelled, based on the selected mean wind flow pattern and the selected turbulence pattern. Thus, site specific information of the selected mean wind flow pattern is merged with the non-site specific information of the selected turbulence pattern to form an accurate site specific wind flow field, which takes expected mean wind flow as well as expected turbulence conditions into account. Furthermore, since the site specific wind flow field is modelled based on the selected mean wind flow pattern and the selected turbulence pattern, the majority of the data processing required for modelling the accurate site specific wind flow field has already been performed, and the processing power required for the modelling is therefore limited. Finally, since the mean wind flow field pattern and the turbulence pattern were selected based on the measured weather data, it is ensured that the modelled site specific wind flow field takes the prevailing weather boundary conditions into account, and thereby the resulting wind flow field may be expected to accurately represent the actual wind flow field across the wind farm site in the near future.

Finally, wind conditions across the wind farm are predicted, based on the site specific wind flow field. Since the site specific wind flow field is expected to accurately reflect the actual wind flow field across the wind farm site, the wind conditions predicted based thereon are also expected to accurately match the actual wind conditions across the wind farm site.

Accordingly, the method according to the invention provides a very accurate prediction of expected wind conditions across the wind farm, thereby allowing precautionary measures to be taken with regard to controlling the wind turbines of the wind farm, should this be required. Furthermore, this is obtained without requiring extensive processing power at the site of the wind farm, thereby allowing the prediction to be performed in real-time or quasi real-time.

Thus, the steps of measuring weather data, selecting a mean wind flow pattern and a turbulence pattern, and modelling a site specific wind flow field may be performed in real-time or quasi real-time. As described above, this is possible due to the data pre-processing performed when generating the first library and the second library. When performing the steps mentioned above in real-time or quasi real-time, accurate prediction of the wind conditions across the wind farm is continuously obtained, and thereby the wind turbines of the wind farm can continuously be controlled in a manner which takes expected wind events into account.

The step of modelling a site specific wind flow field may further be based on wake effects of wind turbines arranged in the wind farm.

According to this embodiment, expected wake effects created by the wind turbines of the wind farm are also taken into account when the site specific wind flow field is modelled. This is appropriate, since the wake effects created by the wind turbines affect the wind flow across the wind farm site. The wake effects may include blockage upstream effects.

The wake effects created by the wind turbines depend, inter alia, on wind direction, rotational speed of the rotor, yaw misalignment, turbulence conditions, inflow angle due to terrain slope, etc. Accordingly, it is possible to actively manipulate or adjust the wake effects created by the wind turbines by appropriately controlling rotational speed, e.g. by controlling pitch angle, dynamic pitch activity, and/or yaw position of some of the wind turbines. Furthermore, the wake effects depend on the type of wind turbine, including rotor diameter and operational design specifications.

The wake effects being taken into account may, e.g., be based on expected upstream and/or downstream aerodynamic interactions between the wind turbines of the wind farm, and the surrounding wind flow. Accordingly, the positions of the wind turbines within the wind farm site should be taken into account when estimating the wake effects.

The step of providing a first library of site specific mean wind flow patterns related to the wind farm site may comprise modelling mean wind flow patterns as a function of time of day and/or as a function of time of year, based on historical weather data related to the wind farm site.

According to this embodiment, weather data is collected at the wind farm site. The weather data may be collected before the wind farm is erected, e.g. as part of a site investigation, and/or the weather data may be collected during operation of the wind turbine. The weather data may be measured by means of one or more metmasts arranged at or near the wind farm site, by means of sensors forming part of or mounted on the wind turbines, by means of global weather surveillance services, by means of lidar measurements, etc.

The weather data may originate from a long period of time, such as several years, e.g. up to 20 years, in order to ensure that the collected weather data is statistically representative for weather conditions prevailing at the wind farm site, at various times of the day and/or at various times of the year. Thereby typical diurnal variations and/or typical seasonal variations in the weather conditions at the wind farm site are reflected in the collected weather data.

The site specific mean wind flow patterns for the first library are then modelled, based on the collected historical weather data related to the wind farm site. The mean wind flow patterns are modelled as a function of time of day and/or as a function of time of year, i.e. taking diurnal variations and/or seasonal variations in expected weather conditions into account. Thus, each flow pattern of the first library relates to a specific time of day and/or a specific time of year. For instance, the mean wind flow patterns of the first library may represent hourly time blocks for an entire year, amounting to 8,760 mean wind flow patterns. This may be regarded as striking an appropriate balance between accuracy and data amount, since it may be expected that the mean wind flow field across the wind farm site varies on a slower time scale than hourly. For instance, a meteorological standard of 10 minutes or less may be reached. However, the time resolution of the mean wind flow patterns of the first library may be higher or lower than one hour.

The mean wind flow patterns may be generated based on aggregated mean weather data originating from several years, and/or based on weather data considered to represent a 'typical year' at the position of the wind farm site.

The step of providing a first library of site specific mean wind flow patterns may further take known terrain features of the wind farm site into account. Such known terrain feature may, e.g., include elevation variations, such as hills, mountains and/or valleys, obstacles, such as buildings or walls, roughness, such as vegetation, and/or any other suitable kind of terrain feature which may be expected to affect the mean wind flow across the wind farm, e.g. resulting in local regions with slow down effect, speed up effects, and/or combined with wind turning.

The step of providing a second library of non-site specific turbulence patterns may comprise modelling turbulence patterns based on general topological features. Such general topological features may, e.g., include structures or features which are expected to give rise to turbulence, such as hills, valleys, buildings, wind turbines, in particular their rotors, vegetation, etc. Thus, according to this embodiment, the turbulence patterns of the second library reflect the presence or non-presence of such structures or features.

Alternatively or additionally, the turbulence patterns of the second library may be modelled based on atmospheric conditions, e.g. including atmospheric boundary layer heights, and/or based on any other suitable conditions which may be expected to affect turbulence, particularly energy containing eddies and their length scale.

The step of measuring weather data at a plurality of positions within the wind farm site may comprise measuring wind data at a plurality of positions within the wind farm site. The wind data may, e.g., include measurements of wind speed, wind direction, turbulence conditions, gust conditions, etc. Such wind data are considered relevant for predicting the wind flow field across the wind farm site.

Alternatively or additionally, the measured weather data may include measurements of humidity, precipitation, air density, temperature, e.g. absolute temperature and/or variations in temperature as a function of height, and/or any other suitable kind of weather data which may be expected to affect the wind flow field across the wind farm site.

The step of selecting a mean wind flow pattern based on the first library may comprise the steps of:
comparing the measured weather data to weather data related to the mean wind flow patterns of the first library, and
selecting a mean wind flow pattern which provides the best match between the measured weather data and the weather data related to the mean wind flow patterns.

According to this embodiment, the measured weather data is compared to the weather data underlying the mean wind flow patterns of the first library. This could, e.g., be done by means of appropriate multidimensional distance measurements, such as regression analysis. The comparison may, e.g., be a weighted comparison. For instance, if some of the measuring positions are considered more reliable and/or more important than other measuring positions, then the most reliable and/or important measuring positions may be given a higher weight in the comparison than the less reliable and/or important measuring positions.

Based on the comparison, a mean wind flow pattern is selected which provides the best match between the measured weather data and the weather data underlying the mean wind flow patterns of the first library, and which may therefore be expected to be the one which most accurately reflect the actual mean wind flow field at the wind farm site, under the given weather conditions. For instance, a wind flow pattern representing the smallest multidimensional distance to the measured weather data may be selected.

The step of selecting a mean wind flow pattern may comprise the steps of:
generating an interpolation between two or more of the mean wind flow patterns of the first library, or an extrapolation of one of the mean wind flow patterns of the first library, based on the step of comparing, thereby obtaining an interpolated or extrapolated mean wind flow pattern, and
selecting the interpolated or extrapolated mean wind flow pattern.

In the case that none of the mean wind flow patterns of the first library provides a sufficiently good match to the measured weather data, a mean wind flow pattern may instead be selected based on two or more of the mean wind flow patterns of the first library. According to this embodiment, this is done by generating an appropriate interpolation between two or more of the mean wind flow patterns of the first library, e.g. the two or more mean wind flow patterns which define the shortest distances to the measured weather data. However, the interpolation may be considered as providing a better match.

Alternatively, a mean wind flow pattern may be generated as an extrapolation of one of the mean wind flow patterns of the first library. This could, e.g., be relevant if the measured weather data lie outside the range of the weather data underlying the mean wind flow pattern of the first library. The extrapolation may be generated from the mean wind flow pattern which defines the shortest distance to the measured weather data.

In any event, once an interpolated or extrapolated mean wind flow pattern has been generated as described above, the interpolated or extrapolated mean wind flow pattern is selected. Accordingly, a good match between the selected mean wind flow pattern and the measured weather data is ensured.

The interpolated or extrapolated mean wind flow pattern may further be added to the first library. Thereby the first library may be continuously extended and improved, based on the measured weather data.

In the case that an extrapolated mean wind flow pattern is selected, a flag or a warning may be raised, since an extrapolation may be regarded as less reliant than an interpolation or a selection of a mean wind flow pattern which already formed part of the first library. This may prompt deactivation of some specific plant control features relying high accuracy of the real time flow modelled information.

Similarly, the step of selecting a turbulence pattern based on the second library may comprise the steps of:
 comparing the measured weather data to weather data related to the turbulence patterns of the second library, and
 selecting a turbulence pattern which provides the best match between the measured weather data and the weather data related to the turbulence patterns.

This is similar to the selection of the mean wind flow pattern described above, and the remarks set forth in this regard are therefore equally applicable here.

The step of selecting a turbulence pattern may comprise the steps of:
 generating an interpolation between two or more of the turbulence patterns of the second library, or an extrapolation of one of the turbulence patterns of the second library, based on the step of comparing, thereby obtaining an interpolated or extrapolated turbulence pattern, and
 selecting the interpolated or extrapolated turbulence pattern.

This is also similar to the interpolation or extrapolation of mean wind flow patterns described above, and the remarks set forth in this regard are therefore equally applicable here.

The method may further comprise the step of updating the first library and/or the second library, based on the measured weather data. This may, e.g., include updating the first library and/or the second library based on interpolations and/or extrapolations as described above. Alternatively or additionally, the first library and/or the second library may be updated based on actually measured wind flow fields following actually measured weather data. This could, e.g., include adjusting some of the mean wind flow patterns of the first library and/or turbulence patterns of the second library, or adding further mean wind flow patterns and/or turbulence patterns to the respective libraries.

In any event, by updating the first library and/or the second library, based on the measured weather data, the libraries are continuously expanded and improved, thereby increasing the accuracy of future predictions of wind conditions across the wind farm.

The method may further comprise the step of controlling the wind turbines of the wind farm in accordance with the predicted wind conditions across the wind farm.

According to this embodiment, the predicted wind conditions across the wind farm are in fact applied in the control of the wind turbines of the wind farm. For instance, in the case that the predicted wind conditions imply that an extreme wind event is travelling through the wind farm, e.g. in the form of hyper local gusts, high wind speeds, extreme turbulence conditions, etc., precautionary measures may be taken in the control of the wind turbines which are expected to be affected by the wind event. Thereby the wind turbines may be protected against the full effect of the wind event.

Alternatively or additionally, some of the wind turbines may be operated in accordance with an aggressive control strategy, maximising power production, in the case that the predicted wind conditions indicate that the wind turbines are not at risk of being subjected to high loads, and/or curtailment of the wind turbines may be planned based on the predicted wind condition and accumulated fatigue loads on the wind turbines.

Furthermore, some of the wind turbines may be controlled to intentionally misalign with respect to yaw, in order to redirect wake effects, thereby protecting wind turbines arranged downstream.

The control of the wind turbines described above may, e.g., be obtained by a central power plant controller dispatching control commands to the controllers of the individual wind turbines, in accordance with the predicted wind conditions, the wind turbine controllers subsequently controlling the wind turbines in accordance therewith.

The method may further comprise the steps of comparing sensor readings from one or more sensors arranged in the wind farm to the predicted wind conditions, and evaluating reliability of the one or more sensors, based on the comparison.

According to this embodiment, following a prediction of wind conditions across the wind farm, the actual wind conditions are measured, at the site of the wind farm site and during the time interval which the prediction relates to. The measured data is then compared to the predicted wind conditions, at the positions where the sensors are positioned. This can be used for evaluating the accuracy of the prediction, as well as for evaluating the reliability of the sensors.

For instance, if it is established that the measured data generally differs from the predicted wind conditions, then it is likely that the prediction is inaccurate. On the other hand, if the measured data and the predicted wind conditions are generally in conformity with each other, but the data originating from one or a few of the sensors differ(s) from the predicted wind conditions, then it is likely that this sensor or these sensors is/are erroneous, faulty or in other ways unreliable, and the sensor(s) in question may therefore be investigated or simply replaced. For instance, in cold climate operation, where sensors such as wind vane or cup anemometers do not operate when frozen, this may be the cause of unreliable or missing sensor signals.

The step of predicting wind conditions across the wind farm, based on the site specific wind flow field, may comprise predicting wind conditions across the wind farm during an immediate future time period of 1-10 minutes. According to this embodiment, the wind conditions across the wind farm are predicted on a short time scale, thereby providing a prediction which is essentially real-time flow modelling of the wind conditions across the wind farm site.

BRIEF DESCRIPTION OF THE DRAWINGS

The invention will now be described in further detail with reference to the accompanying drawings in which.

DETAILED DESCRIPTION OF THE DRAWINGS

Figure 1:
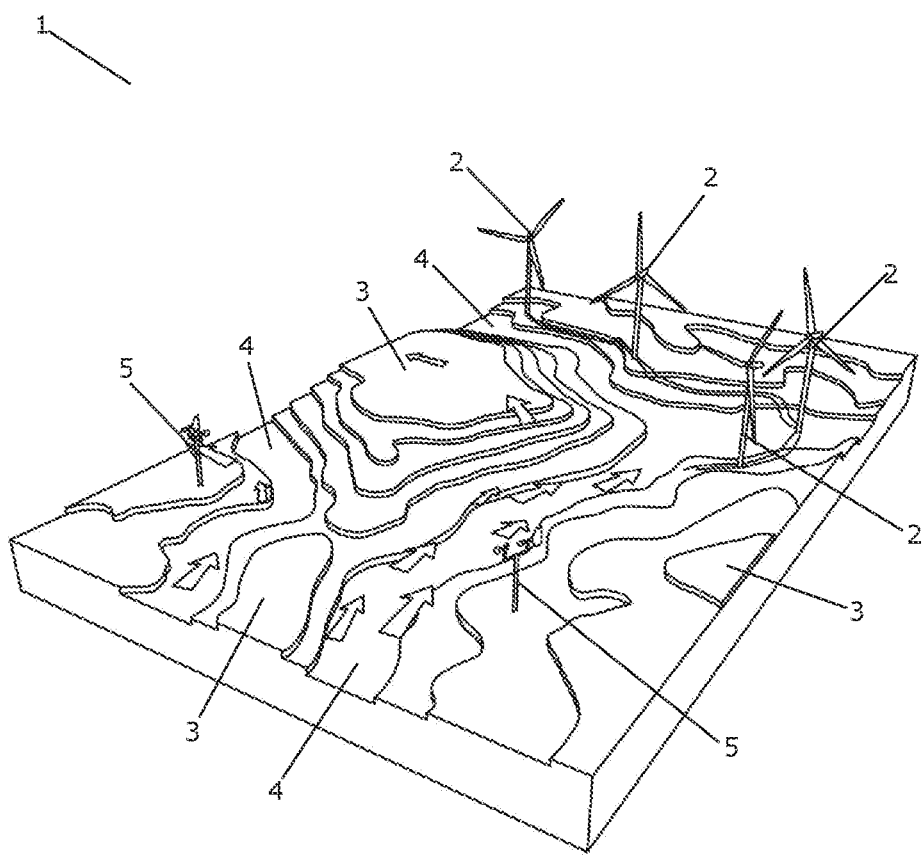
FIG. 1 illustrates a wind farm in which a method according to an embodiment of the invention may be performed.

FIG. 1 illustrates a wind farm 1 comprising a plurality of wind turbines 2, four of which are shown. The site of the wind farm 1 defines elevation variations in the form of hills 3 and valleys 4, which affect the wind flow through the wind farm 1. Two metmasts 5 are arranged within the wind farm 1 for measuring weather conditions, including wind conditions, such as wind speed and wind direction.

Real-time prediction of wind conditions across the wind farm 1 may be obtained in the following manner. A first library of site specific mean wind flow patterns related to the site of the wind farm 1 is provided. The site specific mean wind flow patterns take site specific conditions into account, e.g. including the hills 3 and the valleys 4, the positions of the wind turbines 2, general climatic conditions at the site, etc.

Furthermore, a second library of non-site specific turbulence patterns is provided. The turbulence patterns are site agnostic in the sense that they are based on more general considerations, such as atmospheric conditions, climatic zone of the site, generic structures, etc.

When real-time prediction of wind conditions across the wind farm 1 is desired, weather data is measured at a plurality of positions across the wind farm 1. This could, e.g., be done by means of the metmasts 5 and/or by means of sensors mounted on or forming part of the wind turbines 2.

Based on the measured weather data, a mean wind flow pattern is selected based on the first library, and a turbulence pattern is selected based on the second library. This could include selecting a wind flow pattern already forming part of the first library and/or selecting a turbulence already forming part of the second library, e.g. a respective pattern which provides the best match to the measured weather data. As an alternative, wind flow pattern and/or a turbulence pattern may be selected as an interpolation between two or more patterns or as an extrapolation of a pattern which already forms part of the respective first or second library. This has already been described above.

A site specific wind flow field across the wind farm 1 is then modelled, based on the selected mean wind flow pattern and the selected turbulence pattern. Finally, wind conditions across the wind farm 1 are predicted, based on the site specific wind flow field.

Since the selected mean wind flow pattern and the selected turbulence pattern were generated 'cup front', i.e. well before the real-time prediction of wind conditions across the wind farm 1 is required, it is possible to perform the real-time prediction without requiring extensive processing power at the wind farm 1.

Figure 2:
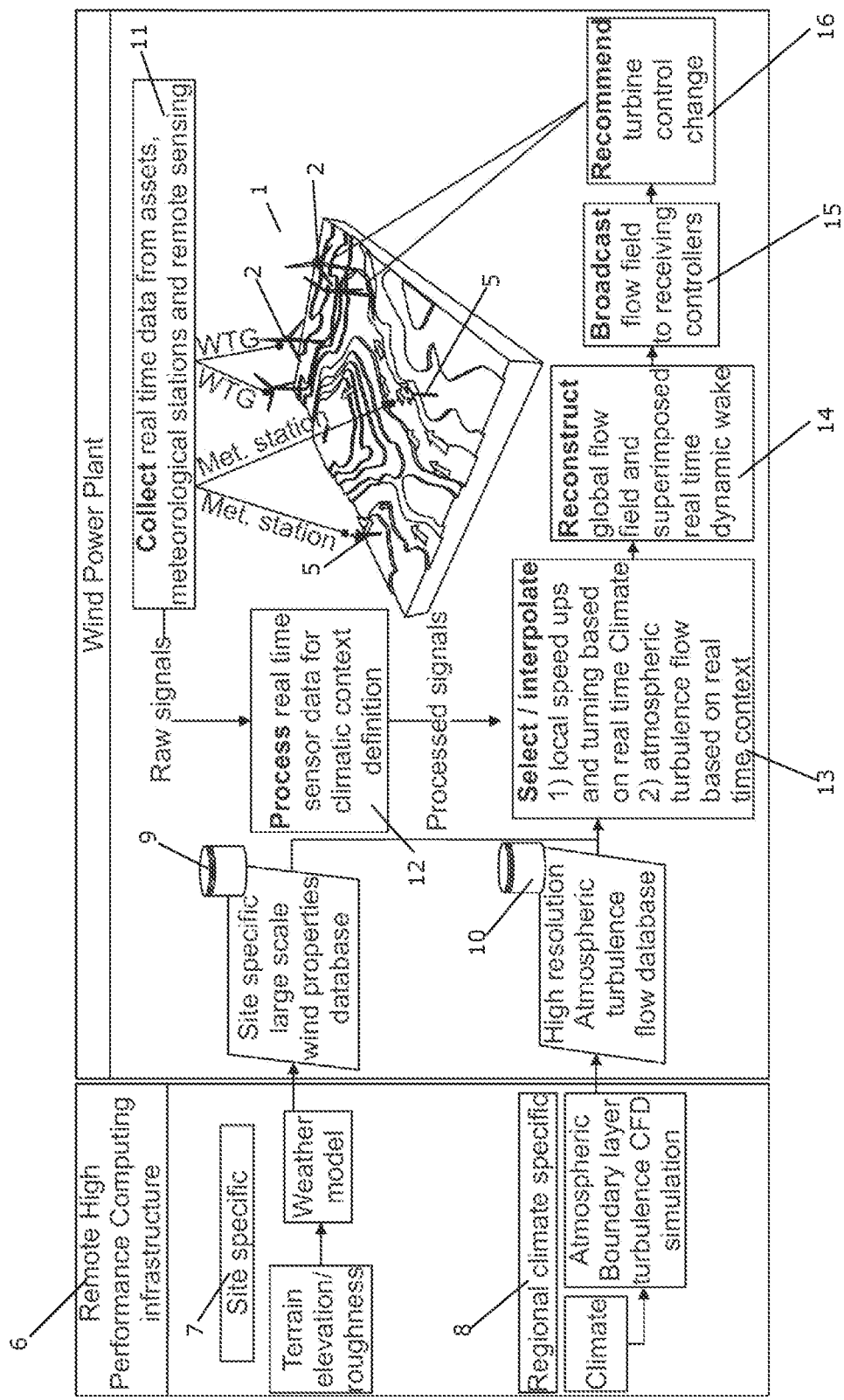
FIG. 2 is a diagram illustrating a method according to an embodiment of the invention.

FIG. 2 is a diagram illustrating a method for real-time prediction of wind conditions across a wind farm 1 according to an embodiment of the invention. At a processing facility 6 located remotely with respect to the wind farm 1, site specific calculations 7 and regional climate specific calculations 8 are performed.

The site specific calculations 7 are based on information regarding terrain, elevation, roughness, etc. of the wind farm 1, and on a weather model being specific for the location of the wind farm 1. The result is a first library 9 of site specific mean wind flow patterns, which is provided to the wind farm 1.

The regional climate specific calculations 8 are based on generic information regarding climate, and on simulations of atmospheric boundary layer turbulence. The result is a second library 10 of high resolution, but non-site specific, turbulence patterns, which is also provided to the wind farm 1.

At the wind farm 1, real time weather data is collected 11, e.g. by means of metmasts 5 and/or by means of sensors mounted on or forming part of the wind turbines 2 of the wind farm 1. The measured weather data is processed 12 in real time, and based on the processed data a comparison 13 is made to the mean wind flow patterns of the first library 9 and the turbulence patterns of the second library 10. This results in the selection of a mean wind flow pattern and a turbulence pattern.

A site specific wind flow field is then modelled 14, based on the selected mean wind flow pattern and the selected turbulence pattern. The site specific wind flow field is detailed as well as based on the real-time weather conditions at the site of the wind farm 1. Furthermore, it can be provided in real-time, without requiring extensive processing power at the wind farm 1, because it is based on the pre-calculated selected mean wind flow pattern and turbulence pattern.

The site specific wind flow field is broadcasted 15 to the controllers of the wind turbines 2, possibly along with recommended wind turbine control changes 16. Accordingly, the wind turbines 2 of the wind farm 1 are controlled in accordance with the predicted wind field, thereby allowing the wind turbines to take precautionary measures, if necessary.

The invention claimed is:

1. A method for real-time prediction of wind conditions across a wind farm comprising a plurality of wind turbines, the wind farm being arranged at a wind farm site, the method comprising:
    providing a first library of site specific mean wind flow patterns related to the wind farm site;
    providing a second library of non-site specific turbulence patterns;
    measuring weather data at a plurality of positions within the wind farm site;
    based on the measured weather data, selecting a mean wind flow pattern based on the first library and a turbulence pattern based on the second library;
    modelling a site specific wind flow field across the wind farm site, based on the selected mean wind flow pattern and the selected turbulence pattern; and
    predicting wind conditions across the wind farm, based on the site specific wind flow field.

2. The method of claim 1, wherein measuring weather data, selecting a mean wind flow pattern and a turbulence pattern, and modelling a site specific wind flow field are performed in real-time or quasi real-time.

3. The method of claim 1, wherein modelling a site specific wind flow field is further based on wake effects of wind turbines arranged in the wind farm.

4. The method of claim 1, wherein providing a first library of site specific mean wind flow patterns related to the wind farm site comprises modelling mean wind flow patterns as a function of time of day and/or as a function of time of year, based on historical weather data related to the wind farm site.

5. The method of claim 4, wherein the step of providing a first library (9) of site specific mean wind flow patterns further takes known terrain features of the wind farm site into account.

6. The method of claim 1, wherein providing a second library of non-site specific turbulence patterns comprises modelling turbulence patterns based on general topological features.

7. The method of claim 1, wherein measuring weather data at a plurality of positions within the wind farm site comprises measuring wind data at a plurality of positions within the wind farm site.

8. The method of claim 1, wherein selecting a mean wind flow pattern based on the first library comprises the steps of:

comparing the measured weather data to weather data related to the mean wind flow patterns of the first library; and selecting a mean wind flow pattern which provides the best match between the measured weather data and the weather data related to the mean wind flow patterns.

9. The method of claim 8, wherein selecting a mean wind flow pattern comprises the steps of:

generating an interpolation between two or more of the mean wind flow patterns of the first library, or an extrapolation of one of the mean wind flow patterns of the first library, based on the step of comparing, thereby obtaining an interpolated or extrapolated mean wind flow pattern; and selecting the interpolated or extrapolated mean wind flow pattern.

10. The method of claim 1, wherein selecting a turbulence pattern based on the second library comprises the steps of:

comparing the measured weather data to weather data related to the turbulence patterns of the second library; and selecting a turbulence pattern which provides the best match between the measured weather data and the weather data related to the turbulence patterns.

11. The method of claim 10, wherein the step of selecting a turbulence pattern comprises:

generating an interpolation between two or more of the turbulence patterns of the second library, or an extrapolation of one of the turbulence patterns of the second library, based on the step of comparing, thereby obtaining an interpolated or extrapolated turbulence pattern; and selecting the interpolated or extrapolated turbulence pattern.

12. The method of claim 1, further comprising updating the first library and/or the second library, based on the measured weather data.

13. The method of claim 1, further comprising controlling the wind turbines of the wind farm in accordance with the predicted wind conditions across the wind farm.

14. The method of claim 1, further comprising comparing sensor readings from one or more sensors arranged in the wind farm to the predicted wind conditions, and evaluating reliability of the one or more sensors, based on the comparison.

15. The method of claim 1, wherein predicting wind conditions across the wind farm, based on the site specific wind flow field, comprises predicting wind conditions across the wind farm during an immediate future time period of 1-10 minutes.

16. A method for real-time prediction of wind conditions across a wind farm comprising a plurality of wind turbines, the wind farm being arranged at a wind farm site, the method comprising:

providing a first library of site specific mean wind flow patterns related to the wind farm site;

providing a second library of non-site specific turbulence patterns;

measuring weather data at a plurality of positions within the wind farm site;

based on the measured weather data, selecting a mean wind flow pattern based on the first library and a turbulence pattern based on the second library;

modelling a site specific wind flow field across the wind farm site, based on the selected mean wind flow pattern and the selected turbulence pattern; and predicting wind conditions across the wind farm, based on the site specific wind flow field;

wherein:

measuring weather data, selecting the mean wind flow pattern and the turbulence pattern, and modelling the site specific wind flow field are performed in real-time or quasi real-time; and modelling the site specific wind flow field is further based on wake effects of wind turbines arranged in the wind farm.

* * * * *